United States Patent
Greenslade

(10) Patent No.: US 11,347,188 B2
(45) Date of Patent: May 31, 2022

(54) STEPPER MOTOR FOR USE IN ROTARY CONTROL ASSEMBLY OF INPUT DEVICE

(71) Applicant: MICROSOFT TECHNOLOGY LICENSING, LLC, Redmond, WA (US)

(72) Inventor: Jason Greenslade, Shenzhen-Tongf (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 343 days.

(21) Appl. No.: 16/479,168

(22) PCT Filed: Jan. 25, 2017

(86) PCT No.: PCT/CN2017/072634
§ 371 (c)(1),
(2) Date: Jul. 18, 2019

(87) PCT Pub. No.: WO2018/137179
PCT Pub. Date: Aug. 2, 2018

(65) Prior Publication Data
US 2019/0332064 A1    Oct. 31, 2019

(51) Int. Cl.
*G05B 11/01*    (2006.01)
*G04C 3/14*    (2006.01)
(Continued)

(52) U.S. Cl.
CPC .............. *G04C 3/143* (2013.01); *G06F 3/016* (2013.01); *G06F 3/038* (2013.01); *G06F 3/0362* (2013.01)

(58) Field of Classification Search
CPC ....... G04C 3/143; G06F 3/038; G06F 3/0362; G06F 3/016
(Continued)

(56) References Cited

U.S. PATENT DOCUMENTS 3,586,953 A   6/1971   Markkanen et al.
4,477,196 A   10/1984  Ito
(Continued)

FOREIGN PATENT DOCUMENTS

CN   1947088 A     4/2007
CN   201611475 U   10/2010
(Continued)

OTHER PUBLICATIONS

"Extended Search Report Issued in European Patent Application No. 17894174.6", dated Aug. 14, 2020, 8 Pages.
(Continued)

*Primary Examiner* — Kawing Chan
*Assistant Examiner* — Gabriel Agared
(74) *Attorney, Agent, or Firm* — Arentfox Schiff LLP

(57) ABSTRACT

Embodiments of the subject matter described herein relates to a stepper motor for use in a rotary control assembly of an input device. The stepper motor includes a shaft; a magnet coupled to the shaft and operable to rotate with a rotation of the shaft, the magnet generating a first magnetic field; a first coil arranged on a rotational path of the magnet; and a first current source configured to supply a first current to the first coil to cause the first coil to generate a second magnetic field, a main direction of the second magnetic field being substantially parallel with a main direction of the first magnetic field while the magnet rotates and passes the first coil.

10 Claims, 3 Drawing Sheets

(51) Int. Cl.
*G06F 3/01* (2006.01)
*G06F 3/0362* (2013.01)
*G06F 3/038* (2013.01)

(58) Field of Classification Search
USPC .......................................................... 318/671
See application file for complete search history.

(56) References Cited

U.S. PATENT DOCUMENTS

| | | | |
|---|---|---|---|
| 4,647,889 A | | 3/1987 | Addis |
| 4,652,805 A | | 3/1987 | Kohn |
| 5,189,355 A | | 2/1993 | Larkins et al. |
| 5,355,373 A | | 10/1994 | Salmon et al. |
| 5,428,192 A | * | 6/1995 | Chen .................. G06F 3/046 178/20.03 |
| 6,179,829 B1 | | 1/2001 | Bisch et al. |
| 6,586,898 B2 | | 7/2003 | King et al. |
| 7,619,376 B2 | | 11/2009 | Hiroe et al. |
| 8,975,854 B1 | | 3/2015 | Poulad et al. |
| 9,007,302 B1 | | 4/2015 | Bandt-Horn |
| 2004/0066189 A1 | * | 4/2004 | Lopez ................ G01N 27/9046 324/238 |
| 2004/0263011 A1 | * | 12/2004 | Barada ................ F16C 32/0451 310/90.5 |
| 2007/0188454 A1 | | 8/2007 | O'sullivan et al. |
| 2008/0169731 A1 | | 7/2008 | Lin et al. |
| 2009/0231113 A1 | | 9/2009 | Olien et al. |
| 2010/0079102 A1 | | 4/2010 | Servidone |
| 2012/0182339 A1 | * | 7/2012 | Oshima ................ A61J 3/07 347/10 |
| 2013/0278086 A1 | | 10/2013 | Furlan et al. |
| 2015/0311741 A1 | | 10/2015 | Baker et al. |
| 2016/0378187 A1 | | 12/2016 | Moussette et al. |
| 2017/0090572 A1 | * | 3/2017 | Holenarsipur ........ G06F 3/0362 |
| 2018/0279051 A1 | * | 9/2018 | Reining ................ H04R 9/063 |

FOREIGN PATENT DOCUMENTS

| | | |
|---|---|---|
| CN | 103324311 A | 9/2013 |
| CN | 105103421 A | 11/2015 |
| CN | 204852090 U | 12/2015 |
| CN | 106227346 A | 12/2016 |
| DE | 102006007089 A1 | 8/2006 |
| EP | 0265738 A2 | 5/1988 |
| JP | H01156603 A | 6/1989 |
| JP | 2006077820 A | 3/2006 |

OTHER PUBLICATIONS

"Programmable Haptic Rotary Controller", Retrieved from http://web.archive.org/web/20160725094122/http://www.intuitekproducts.com/haptics/documents/IntuiTek-Rotary-Haptic-PR-1.5-specification-sheet.pdf, Retrieved Date: Jul. 25, 2016, 2 Pages.

"Stepper Motor as Rotary Encoder", Retrieved from http://home.clear.net.nz/pages/joecolquitt/stepper_as_encoder.html. Retrieved on: Jul. 25, 2016, 2 Pages.

PCT/CN2017/072634, "International Search Report and Written Opinion Issued in PCT Application No. PCT/CN2017/072634", dated Nov. 1, 2017, 11 Pages.

"First Office Action and Search Report Issued in Chinese Patent Application No. 201780083684.8", dated Sep. 14, 2021, 11 Pages.

"First Examination Report Issued in Indian Patent Application No. 201947028687", dated Sep. 7, 2021, 4 Pages.

"Office Action Issued in European Patent Application No. 17894174.6", dated Dec. 16, 2021, 4 Pages.

\* cited by examiner

STEPPER MOTOR FOR USE IN ROTARY CONTROL ASSEMBLY OF INPUT DEVICE

CROSS-REFERENCE TO RELATED APPLICATION

This application is a 35 U.S.C. § 371 National Phase Application of PCT Application No. PCT/CN2017/072634 filed Jan. 25, 2017, entitled "STEPPER MOTOR FOR USE IN ROTARY CONTROL ASSEMBLY OF INPUT DEVICE," which is assigned to the assignee hereof and hereby expressly incorporated by reference herein for all purposes.

FIELD

Embodiments of the subject matter described herein generally relates to an electrical device, and more particularly, to a stepper motor for use in a rotary control assembly of an input device.

BACKGROUND

Among various input devices, mouse is widely used for facilitating the location of a cursor at a target position or scrolling the content of a document displayed on a webpage, for example. In additional to several buttons (such as, the left click button and right click button), most mice are also provided with a wheel (also called a roller or a thumbwheel). A wheel can be scrolled by a user's finger, and rotation of the wheel is subsequently measured and converted to various input signals to realize scrolling, zooming and other operations to the content on the display. As one of the most commonly-used input devices, mouse especially the wheels thereof have a direct impact on the operation efficiency and user experience. Other types of rotary control assembly, such as volume control and thermostat control, due to similar rotary mechanism, may face similar challenges and thus need to be improved.

SUMMARY

Embodiments of the subject matter described herein provide a stepper motor for use in a rotary control assembly. The stepper motor includes a shaft, a magnet for generating a first magnetic field, and a first coil arranged on a rotational path of the magnet. The magnet is coupled to the shaft and operable to rotate with a rotation of the shaft. The stepper motor further includes a first current source which is configured to supply a first current to the first coil to trigger the first coil to generate a second magnetic field. A main direction of the second magnetic field is substantially parallel with a main direction of the first magnetic field while the magnet rotates and passes the first coil.

Based on the interaction between the first magnetic field and the second magnetic field, a so-called "detent" will be created between the magnet and the detent coils (also referred to as the first and second coils) in opposition to the rotational direction of the rotating part, such as a wheel of a mouse or a knob of a volume control, which will in turn provide a haptic feedback back to the user who is scrolling the rotating part. Furthermore, with a flexible design and arrangement of such detent coils, along with controlled and variable detent currents provided by the current source according to embodiments of the subject matter described herein, numerous and even complicated haptic feedbacks or "feels" can be achieved according to the requirements.

It is to be understood that the Summary is not intended to identify key or essential features of implementations of the subject matter described herein, nor is it intended to be used to limit the scope of the subject matter described herein. Other features of the subject matter described herein will become easily comprehensible through the description below.

DESCRIPTION OF DRAWINGS

Above and other objectives, features and advantages of the subject matter described herein will become more apparent through more detailed depiction of example embodiments of the subject matter described herein in conjunction with accompanying drawings, wherein in the example embodiments of the subject matter described herein, same reference numerals usually represent same components.

Throughout the drawings, the same or similar reference symbols are used to indicate the same or similar elements.

DETAILED DESCRIPTION OF EMBODIMENTS

Figure 1:
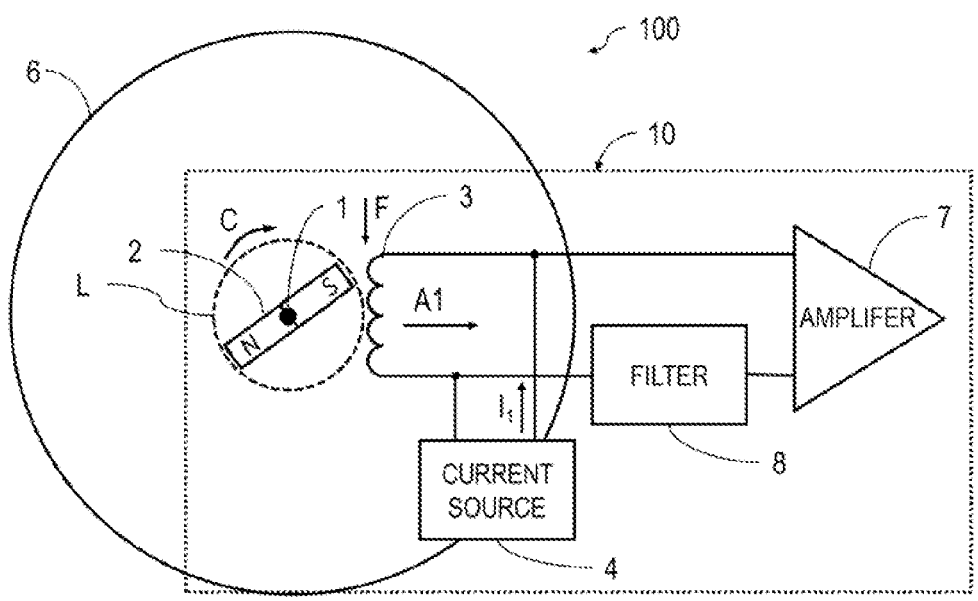
FIG. 1 illustrates a schematic view of a stepper motor for use in a wheel assembly of input device according to embodiments of the subject matter described herein.

Principles of the subject matter described herein will now be described with reference to several example embodiments shown in the drawings. Though example embodiments of the subject matter described herein are illustrated in the drawings, it is to be understood that the embodiments are described only to facilitate those skilled in art in better understanding and thereby achieving the subject matter described herein, rather than to limit the scope of the disclosure in any manner.

As used herein, the phrase "include(s)" and its variants shall be interpreted as an open term meaning "including but not limited to." The phrase "based on" shall be interpreted as "at least partially based on." The phrase "an embodiment" or "one embodiment" shall be interpreted as "at least one embodiment." The phrase "another embodiment" shall be interpreted as "at least one other embodiment." The phrases like "first" and "second" may refer to different or the same objects. Other definitions might also be included explicitly and implicitly in the following description.

Some values or value ranges might be described in the following. It is to be understood that these values and value ranges are only for the purpose of illustration, which may be advantageous to practice the idea of the subject matter described herein. However, depiction of these examples is not intended to limit the scope of the subject matter described herein in any manner. According to the specific application scenarios and needs, the values or value ranges may be set otherwise.

While principles of the subject matter described herein will be illustrated with reference to a wheel assembly of an input device (for example, a mouse), it is to be understood that the same principles may also be applied to other types of rotary control assembly in other systems, such as a volume control in a stereo system and a thermostat control in a thermostat.

Some of conventional wheels for use in the input devices, such as mechanical wheels or infrared wheels, cannot provide the user with a haptic/tactile feedback during the wheel scrolling process to indicate that, for example, the wheel is scrolling or arriving at a particular angular position, let alone a tunable haptic/tactile feedback that can be programmed by the user. Therefore, it is preferable that the user may have such a "feel" representative of the type of control or operation being effected by the wheel. It is also desirable for the user to program in software to achieve variable or controllable haptic feedback.

FIG. 1 schematically illustrates a stepper motor 10 for use in a wheel assembly 100 of an input device according to embodiments of the present application. Examples of the input device include, but are not limited to, a mouse, a track ball, or any other forms of pointing devices that can be used in the remote-control system. A stepper motor 10 with its shaft 1 coupled to a wheel 6 of an input device can be used as a main component of the wheel assembly 100. In this case, the stepper motor 10 may operate under a manual mode or as a generator upon the scrolling of the user's finger on the wheel.

Figure 2:
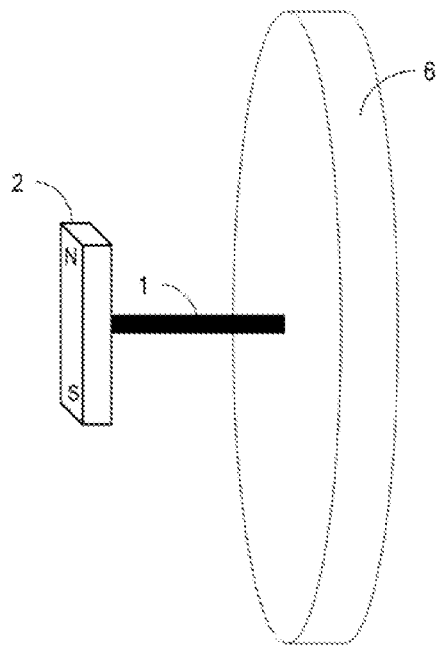
FIG. 2 illustrates a partial perspective view of the wheel assembly.

As shown in FIG. 1, the stepper motor 10 as shown generally includes a shaft 1, a magnet 2 coupled to the shaft 1, and a coil 3 (hereafter referred to "first coil"). As shown in FIG. 1, the magnet 2 generating a first magnetic field is coupled to the shaft 1 and operable to rotate with a rotation of the shaft 1. The shaft 1 as more clearly shown in FIG. 2 is functioning as a rotation axis, with its one end connected to the magnet 2 and the other end connected to a wheel 6. In this way, a user's finger may scroll the wheel 6 to rotate the magnet 2 along a tangential direction C via the torque provided by the shaft 1.

It can be also seen from FIG. 1 that the coil 3 is arranged on a rotational path L (labeled by a dotted circle) of the magnet 2. Further, the stepper motor 10 is provided with a current source 4 which can be configured (for example, programmed) to supply a first current $I_1$ to the coil 3 to trigger (also called energize) the coil 3 to generate a second magnetic field.

According to embodiments of the subject matter described herein, the first coil 3 is oriented in such a way that the main direction of the generated second magnetic field is substantially parallel with a main direction of the first magnetic field while the magnet 2 rotates and passes the a first coils 3. The first magnetic field and second magnetic field in substantially parallel directions then interact with each other, and an attraction or repulsion between the magnet 2 and the first coils 3 will be created.

In this way, a so-called detent force F in opposition to the rotational direction C of the magnet will be created, and such detent force intends to maintain or "lock" the magnet 2 at the location of the first coil 3. With such an arrangement, if a user tries to continue scrolling the wheel 6, the user will need to provide a higher torque (at least a slightly higher torque) than the normal one to overcome this detent force, which will in turn provide a haptic feedback, such as cogging or friction feel, back to the user who is operating the wheel assembly 100. It is to be understood that the clockwise rotational direction of magnet 2 as well as the direction of the detent force F as illustrated in FIG. 1 are only exemplary, and a counter-clockwise rotational direction of magnet 2 along with its corresponding opposite direction of detent force F is also possible.

In an example implementation, the first coil 3 may be mounted on the stator of stepper motor 10, for example, wound about its respective branches/lobes of the stator, so that first coil 3 is oriented radially towards the center of stator. Accordingly, the magnet 2 as depicted in FIG. 1 may be a strip magnet having a south pole S and a north pole N. In some other embodiments, the magnet 2 may have a cylindrical shape and include a semi-cylindrical south pole S and a semi-cylindrical north pole N Magnet 2 with other configuration or shapes can also be considered as needed.

With such configuration, when the magnet 2 rotates and passes the first coil 3, the first magnetic field associated with the magnet 2 will interact with the second magnetic field triggered by the current $I_1$ passing through the first coil 3. As such, if the first coil 3 is triggered by an appropriate current (with a chosen current density and current direction) that in turn generates a second magnetic field in parallel with the first magnetic field associated with the magnet 2, at least a temporary attraction or repulsion force will be created between the magnet 2 and the coil 3. The created attraction or repulsion force then leads to the detents which can then be felt by the user, as discussed above.

In some embodiments, the current source 4 is configured to supply the first current $I_1$ with a predefined pattern. The pattern specifies at least one of intensity and duration of the first current $I_1$. The intensity of the first current, for example, can determine the detent strength. In some embodiments, this current source 4 may be a computer-controlled current source, which enables the current to be switched on or off to initiate or terminate the detent function. In some embodiments, the computer-controlled current source 4 may support width modulated control mechanism to dynamically control the detents. For example, the current source 4 may be connected with a micro-controlled digital-to-analogy converter to adjust the detent current.

In some embodiments, the current source 4 may be a DC current source, such as a DC current mirror including a pair of transistors. In some embodiments, the current source 4 may be a voltage-controlled DC current source. For example, the DC current source 4 may be configured to supply a DC current in a range of 1-10 mA at a controlled voltage level according to the required detent strength or the power consumption.

It is to be understood that although the above example is described with reference to a current source, this is merely for illustration without suggesting any limitations as to the scope of the subject matter described herein. In another implementation, the detent effect may likewise be created by a voltage source.

In some embodiments, the first coil 3 may also be used to generate a first electrical signal A1 in the form of a voltage or a current, while the magnet 2 rotates and passes the first coil 3. This is because the magnetic flux through the coil will be changed as the magnet 2 moves in relation to the coil 3, which magnetic flux change subsequently leads to an induced voltage across the coil. When only one phase coil of the stepper motor is used as shown in FIG. 1, such generated electrical signal A1 may be read and used for, for example, recording the number of revolution during a scroll operation of the wheel 6 or indicating an arrival of the magnet 2 (or the wheel 6) at that particular angular position where the coil 3 is located.

Still referring to FIG. 1, in some embodiments, the stepper motor 10 may further include a first amplifier 7 that is coupled to the first coil 3 and configured to amplify the first electrical signal A1. As illustrated in FIG. 1, in some embodiments, such amplifier 7 may be high gain differential amplifier with low input offset and controlled gain. This is beneficial especially for the case that the rotation speed of the magnet 2 relative to the first coil 3 is low. This is because, for a slow movement of the magnet 2 in relation to the first coil 3, the magnetic flux through the second coil 3 are changed slowly, which subsequently leads to a low-level induced voltage across the coil 3.

Alternatively, or in addition, the stepper motor 10 may further include a first filter 8, such as a low-pass filter, that is coupled between the first current source 4 and the amplifier 7 to remove the DC component. This is beneficial for reducing or eliminating the influence of the DC component on the electrical signal A1 before the electrical signal A1 is introduced to the amplifier 7. In such a way, the electrical signal A1 generated from the first coil 3 (for example, for indicating the number of revolutions) will not be affected by the DC component that is introduced to the same coil (that is, the first coil 3).

Figure 3:
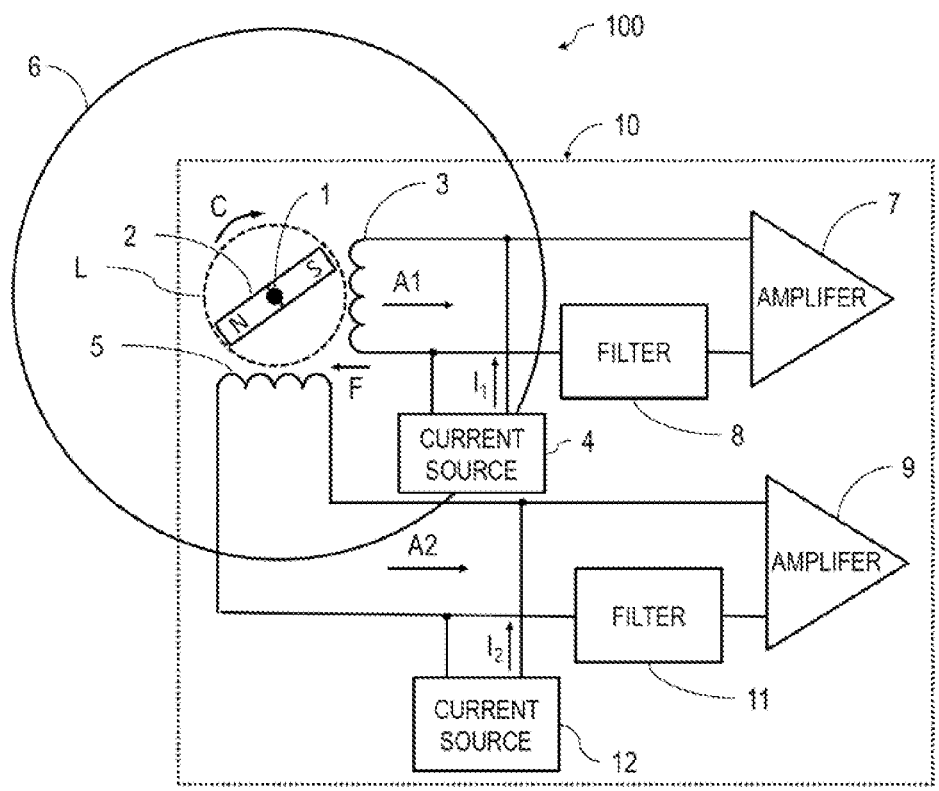
FIG. 3 illustrates a schematic view of a stepper motor for use in a wheel assembly of input device according to other embodiments of the subject matter described herein.

FIG. 3 schematically illustrates a stepper motor 10 for use in a wheel assembly 100 of an input device according to other embodiments of the present application. Compared to the stepper motor 10 as illustrated in FIG. 1, the stepper motor 10 shown in FIG. 3 further includes a second coil 5 which is also arranged on the rotational path L of the magnet 2. The second coil 5 is arranged to generate a second electrical signal A2 while the magnet 2 rotates and passes the second coil 5.

In some embodiments, the second electrical signal A2 and the first electrical signal A1 may have a phase difference of approximately 90 degrees in between. Thereby, the second electrical signal A2 and the first electrical signal A1 together may indicate rotational direction, or the number of steps in the rotational direction of the magnet 2 in the stepper motor 10, or both.

As discussed above, in order to identify the low-level electrical signal A2 due to the slow rotation of the magnet 2, in some embodiments, a second amplifier 9 is coupled to the second coil 5 to amplify the second electrical signal A2, similar as the first amplifier 7 which is coupled the first coil 3 to amplify the first electrical signal A1.

By far, the second coil 5 together with the first coil 3 is only used to generate a directional signal, and the second coil 5 itself is not energized as the first coil 3. However, it is to be understood that it is also possible to energize the second coil 5 in a similar way as discussed above.

Therefore, in some embodiments, the stepper motor 10 may further include a second current source 12 which is configured to supply a second current $I_2$ to the second coil 5 to trigger/energize the second coil 5 to generate a third magnetic field. Likewise, the main direction of the generated third magnetic field is substantially parallel with a main direction of the first magnetic field while the magnet 2 rotates and passes the second coil 5.

Compared to the single coil (that is, the first coil 3) which may only provide a limited number of detents or feels, the second coil 5 triggered/energized by the additional second current source 12 enables an increased number of detents or feels in its operation. As a result, the detent patterns and/or detent locations can be expanded. In other words, each of two coils can be controlled separately as required. As a result, the user may for example feel a particular strength of detent at some given angular positions, while feel a different strength of detent at some other angular positions. In this way, a more flexible design of detent function can be achieved.

Alternatively, or in addition, the stepper motor 10 may further include a second filter 11, such as a low-pass filter, that is coupled between the second current source 12 and the second amplifier 11 to remove the DC component.

In some embodiment, the first coil 3 and the second coil 5 may be successively triggered by the current source 4 and current source 12, respectively, depending on the rotational direction of the magnet 2 in the stepper motor 10 to generate the detents. In some embodiments, such information about the direction of the magnet 2 may facilitate determining the triggering sequence of the first coil 3 and second coil 5, so as to generate the expected detent while the magnet 2 passes the corresponding coil.

In particular, when the magnet 2 rotates along the clockwise direction C as shown in FIG. 3 and passes first coil 3 and second coil 5, a series of induced voltage pulses will follow the same sequence and appear at respective coil.

Figure 4:
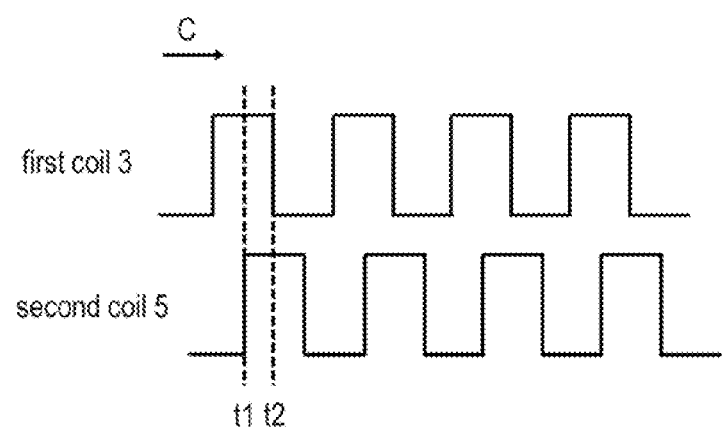
FIG. 4 illustrates waveforms of the sequences of the output electrical signal from two phase coils according to embodiments of the subject matter described herein.

FIG. 4 shows the sequences of the electrical signal output from two coils (or coil 3 and coil 5) according to embodiments of the subject matter described herein. In the case as shown in FIG. 4, the magnet 2 first passes first coil 3 at time t1, and as discussed above, lines of magnetic flux of the first magnetic field associated with the magnet 2 pass through the first coil 3, rendering a change of the magnetic flux through the first coil 3, and such change in magnetic flux further leads to an induced voltage across the first coil 3. Subsequently, the magnet 2 moves and passes the second coil 5 at time t2, and an induced voltage across the second coil 5 will be generated in a similar manner. The generated voltage pulses associated with the phase difference in between can be interpreted and thereby provide additional information about the rotational direction of magnet 2 in the stepper motor 10.

In some other embodiments, instead of using a separated current source to energize the corresponding coil, a single/common current source may be used to apply detent current to both coils. In this case, one of the current sources (either the first current source 4 or the second current source 12) can be saved, therefore, the internal design/structure of the stepper motor 10 can be simplified, and meanwhile the overall cost and power consumption of the stepper motor 10 can be reduced accordingly.

Figure 5:
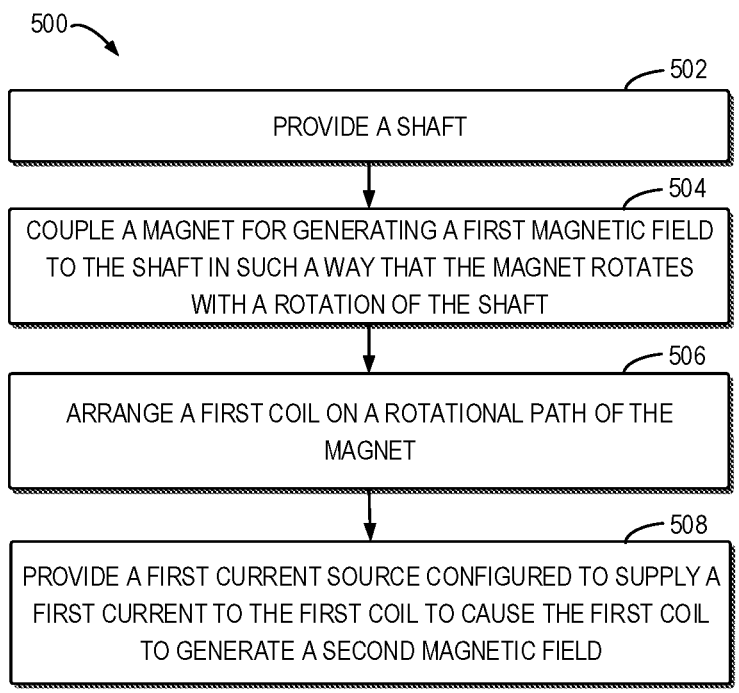
FIG. 5 illustrates a flowchart of a method for manufacturing a stepper motor according to embodiments of the subject matter described herein.

FIG. 5 illustrates a flowchart of a method 500 for manufacturing a stepper motor 10 according to embodiments of the subject matter described herein. It should be understood that the method 500 may also include additional actions not shown and/or omit the illustrated steps. Scope of the subject matter described herein is not limited in this aspect.

At 502, it is provided a shaft 1. At 504, a magnet 2 for generating a first magnetic field is coupled to the shaft 1 in such a way that the magnet 2 rotates with a rotation of the shaft 1. At 506, a first coils 3 is arranged on a rotational path L of the magnet 2. At 508, a current source 4 configured to supply a first current $I_1$ is provided to the first coil 3 to trigger the a first coils 3 to generate a second magnetic field, so that a main direction of the second magnetic field is substantially parallel with a main direction of the first magnetic field while the magnet 2 rotates and passes the first coil 3. It is to be understood that the features as described above all apply to the method 500, which will not be repeated here.

Hereinafter, some example implementations of the subject matter described herein will be enumerate.

In some embodiments, a stepper motor for use in a rotary control assembly is provided. The stepper motor comprises:

a shaft; a magnet coupled to the shaft and operable to rotate with a rotation of the shaft, the magnet generating a first magnetic field; a first coil arranged on a rotational path of the magnet; and a first current source configured to supply a first current to the first coil to cause the first coil to generate a second magnetic field, a main direction of the second magnetic field being substantially parallel with a main direction of the first magnetic field while the magnet rotates and passes the first coil.

In some embodiments, the first coil is arranged to generate a first electrical signal while the magnet rotates and passes the first coil.

In some embodiments, the first current source is configured to supply the first current with a predefined pattern, the pattern specifying at least one of intensity and a duration of the first current.

In some embodiments, the first current source is a DC current source configured to supply a DC current.

In some embodiments, the stepper motor further comprising: a first amplifier coupled to the first coil and configured to amplify the first electrical signal.

In some embodiments, the stepper motor further comprises: a first filter coupled between the first current source and the amplifier and configured to eliminate the DC component.

In some embodiments, the stepper motor further comprises: a second coil arranged on the rotational path of the magnet, the second coil arranged to generate a second electrical signal while the magnet rotates and passes the second coil, the second electrical signal and the first electrical signal having a phase difference of approximately 90 degrees, the second electrical signal and the first electrical signal together indicating at least one of rotational direction and the number of steps in the rotational direction of the magnet in the stepper motor.

In some embodiments, the stepper motor further comprises: a second amplifier coupled to the second coil and configured to amplify the second electrical signal.

In some embodiments, the stepper motor further comprises: a second current source configured to supply a second current to the second coil to cause the second coil to generate a third magnetic field, a main direction of the third magnetic field being substantially parallel with a main direction of the first magnetic field while the magnet rotates and passes the second coil.

In some embodiments, the stepper motor further comprises: a second filter coupled between the second current source and the second amplifier and configured to remove the DC component.

In some embodiments, a rotary control assembly for use in an input device is provided. The rotary control assembly comprises: a rotating part; a shaft; a magnet coupled to the rotating part via the shaft and operable to rotate with a rotation of the shaft, the magnet generating a first magnetic field; a first coil arranged on a rotational path of the magnet; and a first current source configured to supply a first current to the first coil to cause the first coil to generate a second magnetic field, a main direction of the second magnetic field being substantially parallel with a main direction of the first magnetic field while the magnet rotates and passes the first coil.

In some embodiments, the first coil is arranged to generate a first electrical signal while the magnet rotates and passes the first coil.

In some embodiments, the rotary control assembly further comprises: a first amplifier coupled to the first coil and configured to amplify the first electrical signal.

In some embodiments, the first current source is a DC current source configured to supply a DC current.

In some embodiments, the rotary control assembly further comprises: a first filter coupled between the first current source and the amplifier and configured to eliminate the DC component.

In some embodiments, the rotary control assembly further comprises: a second coil arranged on the rotational path of the magnet, the second coil arranged to generate a second electrical signal while the magnet rotates and passes the second coil, the second electrical signal and the first electrical signal having a phase difference of approximately 90 degrees, the second electrical signal and the first electrical signal together indicating at least one of rotational direction and the number of steps in the rotational direction of the magnet in the stepper motor.

In some embodiments, the rotary control assembly further comprises: a second amplifier coupled to the second coil and configured to amplify the second electrical signal.

In some embodiments, the rotary control assembly further comprises: a second current source configured to supply a second current to the second coil to cause the second coil to generate a third magnetic field, a main direction of the third magnetic field being substantially parallel with a main direction of the first magnetic field while the magnet rotates and passes the second coil.

In some embodiments, the rotary control assembly further comprises: a second filter coupled between the second current source and the second amplifier and configured to remove the DC component.

In some embodiments, a method of manufacturing a stepper motor is provided. The method comprises: providing a shaft; coupling a magnet for generating a first magnetic field to the shaft in such a way that the magnet rotates with a rotation of the shaft; arranging a first coil on a rotational path of the magnet; and providing a first current source configured to supply a first current to the first coil to cause the first coil to generate a second magnetic field, a main direction of the second magnetic field being substantially parallel with a main direction of the first magnetic field while the magnet rotates and passes the first coil.

It should be appreciated that above detailed embodiments of the subject matter described herein are only to exemplify or explain principles of the subject matter described herein and not to limit the subject matter described herein. Therefore, any modifications, equivalent alternatives and improvement, etc. without departing from the spirit and scope of the subject matter described herein shall be included in the scope of protection of the subject matter described herein. Meanwhile, appended claims of the subject matter described herein aim to cover all the variations and modifications falling under the scope and boundary of the claims or equivalents of the scope and boundary.

What is claimed is:

1. A stepper motor for use in a rotary control assembly, comprising:
   a shaft;
   a magnet coupled to the shaft and operable to rotate with a rotation of the shaft, the magnet generating a first magnetic field;
   a first coil arranged on a rotational path of the magnet, wherein the first coil is arranged to generate a first electrical signal while the magnet rotates and passes the first coil;
   a first current source configured to supply a first current to the first coil to cause the first coil to generate a second magnetic field, a main direction of the second magnetic field being substantially parallel with a main direction of the first magnetic field while the magnet rotates and passes the first coil;

a first amplifier coupled to the first coil and configured to amplify the first electrical signal;

a first filter coupled between the first current source and the first amplifier and configured to eliminate a DC component a second coil arranged on the rotational path of the magnet, wherein the second coil arranged to generate a second electrical signal while the magnet rotates and passes the second coil; and a second amplifier coupled to the second coil and configured to amplify the second electrical signal;

wherein:
the second electrical signal and the first electrical signal having a phase difference of approximately 90 degrees, and the second electrical signal and the first electrical signal together indicating at least one of rotational direction and a number of steps in the rotational direction of the magnet in the stepper motor.

2. The stepper motor of claim 1, wherein the first current source is configured to supply the first current with a predefined pattern, the pattern specifying at least one of an intensity and a duration of the first current.

3. The stepper motor of claim 1, wherein the first current source is a DC current source configured to supply a DC current.

4. The stepper motor of claim 1, further comprising:
a second current source configured to supply a second current to the second coil to cause the second coil to generate a third magnetic field, a main direction of the third magnetic field being substantially parallel with a main direction of the first magnetic field while the magnet rotates and passes the second coil.

5. The stepper motor of claim 4, further comprising:
a second filter coupled between the second current source and the second amplifier and configured to remove the DC component.

6. A rotary control assembly for use in an input device, comprising:
a rotating part;
a shaft;
a magnet coupled to the rotating part via the shaft and operable to rotate with a rotation of the shaft, the magnet generating a first magnetic field;
a first coil arranged on a rotational path of the magnet, wherein the first coil is arranged to generate a first electrical signal while the magnet rotates and passes the first coil;
a first current source configured to supply a first current to the first coil to cause the first coil to generate a second magnetic field, a main direction of the second magnetic field being substantially parallel with a main direction of the first magnetic field while the magnet rotates and passes the first coil;
a first amplifier coupled to the first coil and configured to amplify the first electrical signal;
a first filter coupled between the first current source and the first amplifier and configured to eliminate a DC component
a second coil arranged on the rotational path of the magnet, wherein the second coil arranged to generate a second electrical signal while the magnet rotates and passes the second coil; and
a second amplifier coupled to the second coil and configured to amplify the second electrical signal;
wherein:
the second electrical signal and the first electrical signal having a phase difference of approximately 90 degrees, and
the second electrical signal and the first electrical signal together indicating at least one of rotational direction and a number of steps in the rotational direction of the magnet.

7. The rotary control assembly of claim 6, wherein the first current source is a DC current source configured to supply a DC current.

8. The rotary control assembly of claim 6, further comprising:
a second current source configured to supply a second current to the second coil to cause the second coil to generate a third magnetic field, a main direction of the third magnetic field being substantially parallel with a main direction of the first magnetic field while the magnet rotates and passes the second coil.

9. The rotary control assembly of claim 8, further comprising:
a second filter coupled between the second current source and the second amplifier and configured to remove the DC component.

10. A method of manufacturing a stepper motor, comprising:
providing a shaft;
coupling a magnet for generating a first magnetic field to the shaft in such a way that the magnet rotates with a rotation of the shaft;
arranging a first coil on a rotational path of the magnet, wherein the first coil is arranged to generate a first electrical signal while the magnet rotates and passes the first coil;
arranging a second coil on the rotational path of the magnet, wherein the second coil arranged to generate a second electrical signal while the magnet rotates and passes the second coil; and
providing:
a first current source configured to supply a first current to the first coil to cause the first coil to generate a second magnetic field, a main direction of the second magnetic field being substantially parallel with a main direction of the first magnetic field while the magnet rotates and passes the first coil;
a first amplifier coupled to the first coil and configured to amplify the first electrical signal;
a first filter coupled between the first current source and the first amplifier and configured to eliminate a DC component and
a second amplifier coupled to the second coil and configured to amplify the second electrical signal;
wherein:
the second electrical signal and the first electrical signal having a phase difference of approximately 90 degrees; and
the second electrical signal and the first electrical signal together indicating at least one of rotational direction and a number of steps in the rotational direction of the magnet in the stepper motor.

* * * * *